United States Patent [19]

Vila Boluda

[11] Patent Number: 5,439,084
[45] Date of Patent: Aug. 8, 1995

[54] DEVICE FOR A GUIDING SLIDING CALIPER FOR A DISK-BRAKE

[75] Inventor: J. Manual Vila Boluda, Barcelone, Spain

[73] Assignee: Bendix Espana S.A., Barcelone, Spain

[21] Appl. No.: 90,065

[22] PCT Filed: Jun. 4, 1993

[86] PCT No.: PCT/EP93/01419

§ 371 Date: Aug. 12, 1993

§ 102(e) Date: Aug. 12, 1993

[87] PCT Pub. No.: WO94/01693

PCT Pub. Date: Jan. 20, 1994

[30] Foreign Application Priority Data

Jul. 10, 1992 [ES] Spain ................... 9201426

[51] Int. Cl.6 ............................. F16D 65/14
[52] U.S. Cl. ................... 188/73.44; 403/22
[58] Field of Search ........... 188/71.1, 73.39, 73.43, 188/73.44, 73.45; 403/22; 411/119, 120, 522

[56] References Cited

U.S. PATENT DOCUMENTS

| 611,815 | 10/1898 | Miller | 411/120 |
| 1,088,515 | 2/1914 | Bazin | 411/120 |
| 1,332,268 | 3/1920 | Nainka | 411/120 |
| 3,610,659 | 10/1971 | Gerarde | 411/119 X |
| 4,475,633 | 10/1984 | Gérard et al. | 188/73.45 |
| 4,641,730 | 1/1987 | Lombardi et al. | 188/73.45 |
| 4,762,206 | 8/1988 | Arimitsu | 188/73.45 |
| 4,854,423 | 8/1989 | Evans et al. | 188/73.45 X |

FOREIGN PATENT DOCUMENTS

| 0046432 | 2/1982 | European Pat. Off. |
| 0052543 | 5/1982 | European Pat. Off. |
| 0297497 | 1/1989 | European Pat. Off. |
| 4025812 | 4/1992 | Germany. |

Primary Examiner—Robert J. Oberleitner
Assistant Examiner—Peter M. Poon
Attorney, Agent, or Firm—Larry J. Palguta; Leo H. McCormick, Jr.

[57] ABSTRACT

Device for guiding a sliding caliper (4) for a disk-brake, comprising a support (1), a screw (2) and a carrier (3). The carrier is rotationally and translationally blocked, except in a direction perpendicular to its axis (3a) by virtue of an open ring (10) housed with a small clearance in a bore (1b) of the support, itself rotationally blocked, and clamping flats made on the external surface of the carrier (3).

3 Claims, 3 Drawing Sheets

DEVICE FOR A GUIDING SLIDING CALIPER FOR A DISK-BRAKE

The present invention relates to a device for guiding a sliding caliper for a disk-brake, comprising:
a support;
a screw comprising a head whose rotation makes it possible to engage this screw in a tapped hole made in the support in order to securely fasten it to the latter;
an essentially cylindrical hollow carrier traversed longitudinally and with a small clearance by the screw and axially blocked between the support and the screw head;
and first blocking means, suitable for preventing the rotation of the carrier about its longitudinal axis, and interacting with flats made on the outer surface of this carrier.

Devices of this type have been used for a long time in the prior art, as the patents U.S. Pat. No. 4,475,633 and U.S. Pat. No. 4,641,730, for example, show.

However, the means for rotationally blocking the carrier in the known systems conventionally consist of a double fork each end of which rotationally blocks a corresponding carrier.

Now, although the known systems of this type give entire satisfaction for disk-brakes comprising two similar carriers relatively close to one another, the use of a double fork becomes impossible in brakes with a single carrier, or ones in which the carriers are structurally different and/or far away from one another.

Furthermore, it has appeared that for brakes subjected to high stresses, and especially for brakes of industrial vehicles of a considerable size, rotationally blocking the carrier alone is not sufficient for guaranteeing the absence of stresses on the guide device, either upon assembly or in operation.

In this context, the object of the invention is to propose a device for guiding a sliding caliper for a disk-brake, arranged so as to reduce the stresses therein.

To this end, the device of the invention is essentially characterized in that the flats are made at the end of the carrier which is turned towards the support and in that the first blocking means comprise:
a circular bore of the support, concentric with the tapped hole which receives the screw;
an open ring having a partially circular external profile housed with a small clearance in the bore of the support, and an internal profile forming two parallel support surfaces slidingly receiving the flats of the carrier, and
second blocking means rotationally blocking the ring with respect to the support.

By virtue of this structure, not only the end of the carrier which is in the vicinity of the support is rotationally blocked, and with it the entire carrier, and allowed to slide inside the internal profile of the ring in order to take up all the manufacturing tolerances, but this end is further held in a direction perpendicular to the support surfaces of the internal profile of the open ring, which guarantees that the carrier always tends to assume an optimum position parallel to the screw instead of adopting an oblique position, which generates stresses.

Moreover, preferably, the second blocking means comprise an axial and/or radial extension engaging in a complementary cavity, either one of the extension and the cavity belonging to the open ring and the other to the support, a stud carried by the open ring constituting, for example, a possible axial extension.

Other advantages of the invention will emerge clearly from the description thereof given hereafter, by way of an indication and with no limitation, with reference to the appended drawing in which.

Figure 1:
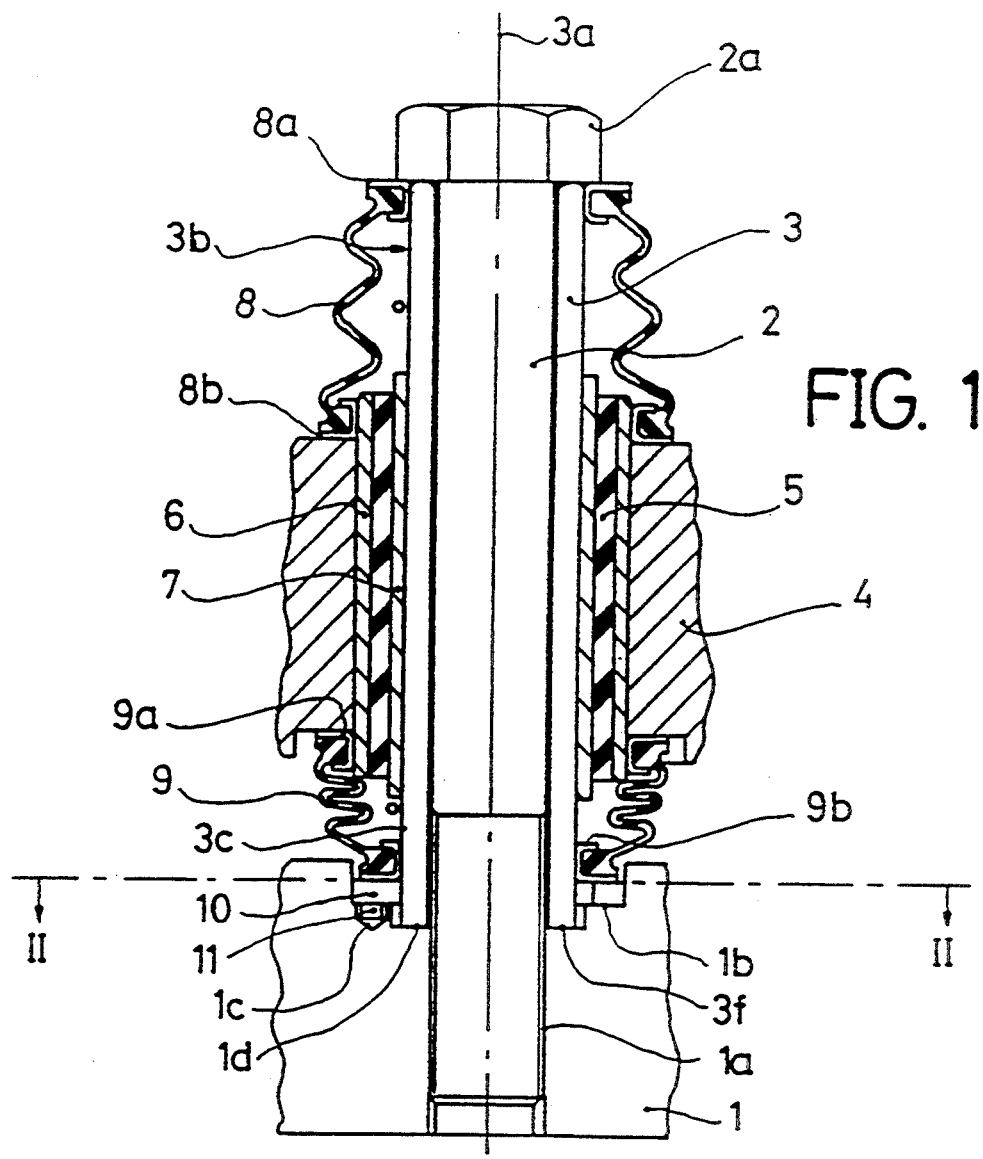
FIG. 1 is a longitudinal sectional view of a guide device in accordance with the invention.
Figure 2:
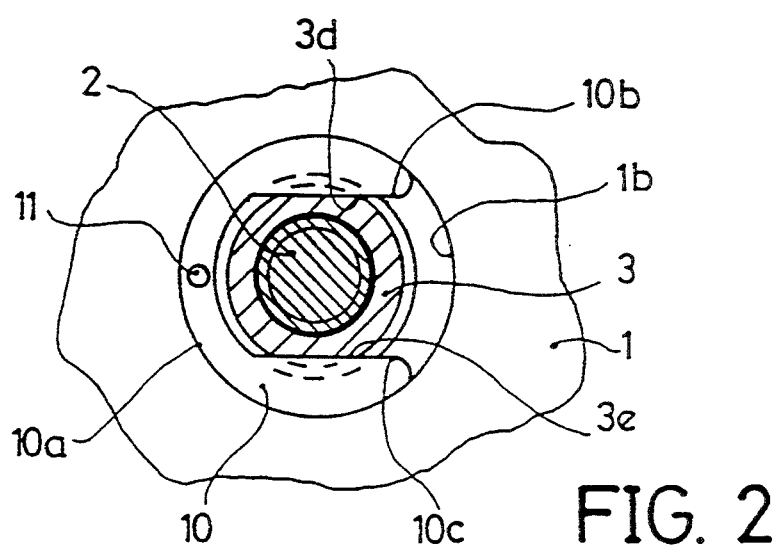
FIG. 2 is a sectional view of this device, along the line II—II of FIG. 1.

The device of the invention is designed in order to optimize the guidance of a sliding caliper in a disk-brake.

This device firstly comprises a support 1, a screw 2, and a carrier 3 on which a brake caliper 4 slides.

The screw 2 has a head 2a via which it can be engaged by a tool enabling it to be screwed into a tapped hole 1a of the support and to be firmly and securely fastened to the latter.

The carrier 3 essentially adopts the shape of a hollow cylinder of revolution of axis 3a and is traversed with a small clearance, along its length, by the screw 2 whose head 2a bears against the support 1 and thus keeps it axially blocked.

As illustrated in FIG. 1, a "Silent block" 5 trapped between the intermediate bushes 6 and 7 may be interposed between the carrier 3 and the caliper 4.

Furthermore, the external surface of the carrier 3 may, at each of the ends 3b, 3c, be protected from dust and other contamination by caps 8 and 9 respectively made from a deformable material and held in place on the caliper, on the one hand, and on the carrier, on the other hand, by means of metal collars 8a, 8b and 9a, 9b.

The carrier 3 [sic] has, at that one of its ends 3c which is turned towards the support 1, two parallel flats 3d, 3e diametrically opposite one another with respect to the axis 3a.

Moreover, the support 1 has a circular bore 1b concentric with the tapped hole 1a.

The device of the invention further comprises an open ring 10 having a partially circular outer profile 10a housed with a small clearance in the bore 1b and an internal profile forming two parallel support surfaces 10b, 10c slidingly receiving the flats 3d, 3e of the carrier.

Finally, the open ring 10 is itself rotationally blocked with respect to the support 1, for example by means of a stud 11 securely fastened to the ring and engaging in a complementary blind hole 1c of the support.

As FIG. 1 shows, the flats 3d, 3e may be made at a certain distance from the axial face 3f of the carrier 3, in which case the support 1 has a second bore 1d concentric with the bore 1b and deeper than it in order to house the end part of the carrier situated between the flats 3d, 3e and the axial face 3f.

By virtue of such an assembly, the carrier may slide in the direction of the support surfaces 10b, 10c while being held perpendicular to this direction, and is only subjected to low stresses.

Figure 3:
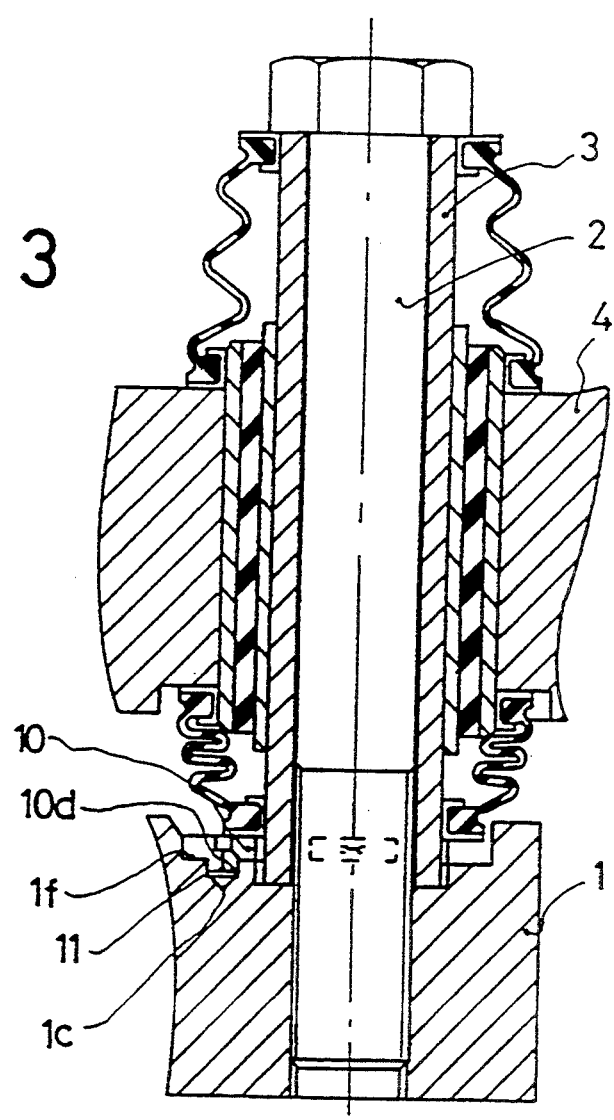
FIG. 3 is a view analogous to FIG. 1, illustrating a second embodiment.
Figure 4:
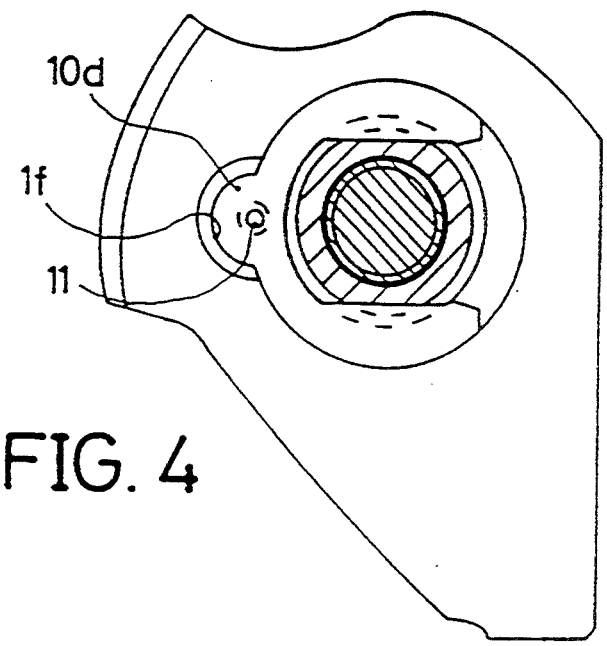
FIG. 4 is a view analogous to FIG. 2, illustrating this second embodiment.

FIGS. 3 and 4 represent another embodiment of the second blocking means, which comprise, in this case, in addition to the stud 11 engaged in the blind hole 1c, a semicircular radial extension 10d of the open ring 10, engaged in a cavity 1f of complementary shape made in the support 1.

Figure 5:
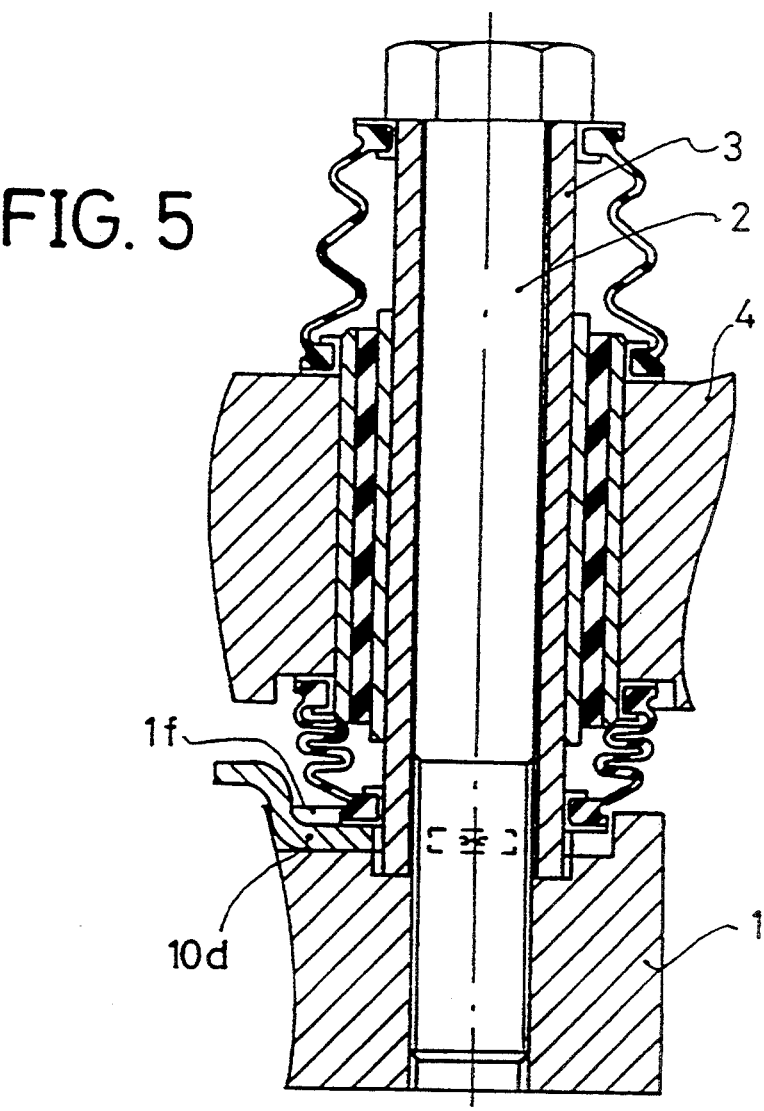
FIG. 5 is a view analogous to FIGS. 1 and 3, illustrating a third embodiment.
Figure 6:
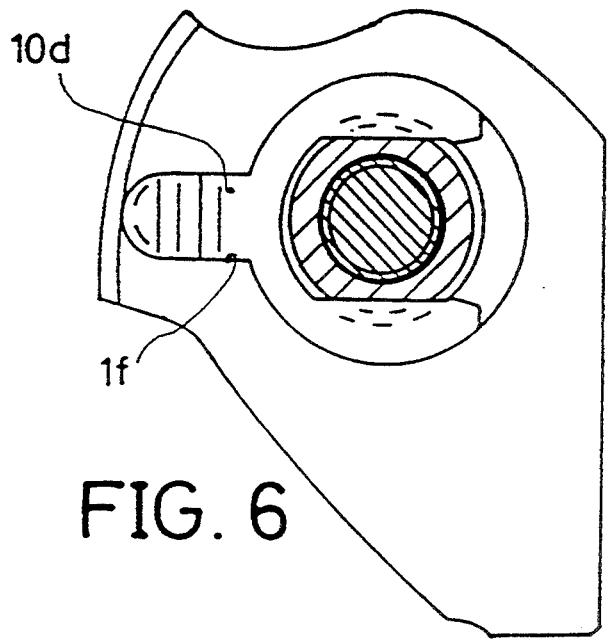
FIG. 6 is a view analogous to FIGS. 2 and 4, illustrating this third embodiment.

Finally, as shown in FIGS. 5 and 6, the second blocking means may also only comprise one radial extension 10d of the open ring 10, by adopting, for example, the shape of a tab, engaged at least partially in a cavity 1f of complementary shape made in the support 1.

I claim:

1. Device for guiding a sliding caliper (4) for a diskbrake, comprising:
   a support (1);
   a screw (2) comprising a head (2a) whose rotation makes it possible to engage this screw in a tapped hole (1a) made in the support in order to securely fasten it to the latter;
   an essentially cylindrical hollow carrier (3) traversed longitudinally and with a small clearance by the screw (2) and axially blocked between the support and the screw head;
   and first blocking means, suitable for preventing the rotation of the carrier about its longitudinal axis (3a), and interacting with flats (3d, 3e) made on the outer surface of this carrier, characterized in that the flats are made at the end (3c) of the carrier which is turned towards the support and in that the first blocking means comprises:
   a circular bore (1b) of the support, concentric with the tapped hole (1a) which receives the screw;
   an open ring (10) having a partially circular external profile (10a) housed with a small clearance in the bore of the support, and an internal profile forming two parallel support surfaces (10b, 10c) slidingly receiving the flats of the carrier, and
   second blocking means (1c, 11; 1f, 10d) rotationally blocking the ring with respect to the support.

2. Device according to claim 1, characterized in that the second blocking means comprises an axial and/or radial extension (11, 10d) engaging in a complementary cavity (1c, 1f), either one of the extension and the cavity belonging to the open ring and the other to the support.

3. Device according to claim 2, characterized in that said radial extension (11) is a stud carried by the open ring.

* * * * *